United States Patent [19]

Silverberg

[11] 4,286,870

[45] Sep. 1, 1981

[54] DOCUMENT BELT WITH DISCRETE VACUUM AREAS

[75] Inventor: Morton Silverberg, Rochester, N.Y.

[73] Assignee: Xerox Corporation, Stamford, Conn.

[21] Appl. No.: 111,058

[22] Filed: Jan. 10, 1980

[51] Int. Cl.³ .................... G03B 27/62; G03B 27/64
[52] U.S. Cl. .................................................... 355/76
[58] Field of Search .................................. 355/75, 76

[56] References Cited

U.S. PATENT DOCUMENTS

| | | |
|---|---|---|
| 3,123,354 | 3/1964 | Ungerer . |
| 3,425,610 | 2/1969 | Stewart . |
| 3,452,982 | 7/1969 | Bischoff . |
| 3,477,558 | 11/1969 | Fleischauer . |
| 3,583,614 | 6/1971 | Foster . |
| 3,677,643 | 7/1972 | Sagawa . |
| 3,863,912 | 2/1975 | Korff . |
| 3,910,570 | 10/1975 | Bleau . |
| 4,043,665 | 2/1977 | Stemmle . |
| 4,043,665 | 8/1977 | Caldwell . |
| 4,047,812 | 9/1977 | Hogan . |

*Primary Examiner*—Monroe H. Hayes

[57] ABSTRACT

In an apertured vacuum belt document handling system for transporting documents to the exposure station of a copier the vacuum apertures are limited to discrete minor areas spaced circumferentially along the belt between unapertured areas, each vacuum apertured area being smaller than the smallest document to be transported. A document is registered in a loading station against the belt completely overlying one vacuum apertured area and advanced on the belt without slippage from the loading station to the exposure station, where the spacing from the other vacuum apertured areas is such that none of them are exposed.

6 Claims, 8 Drawing Figures

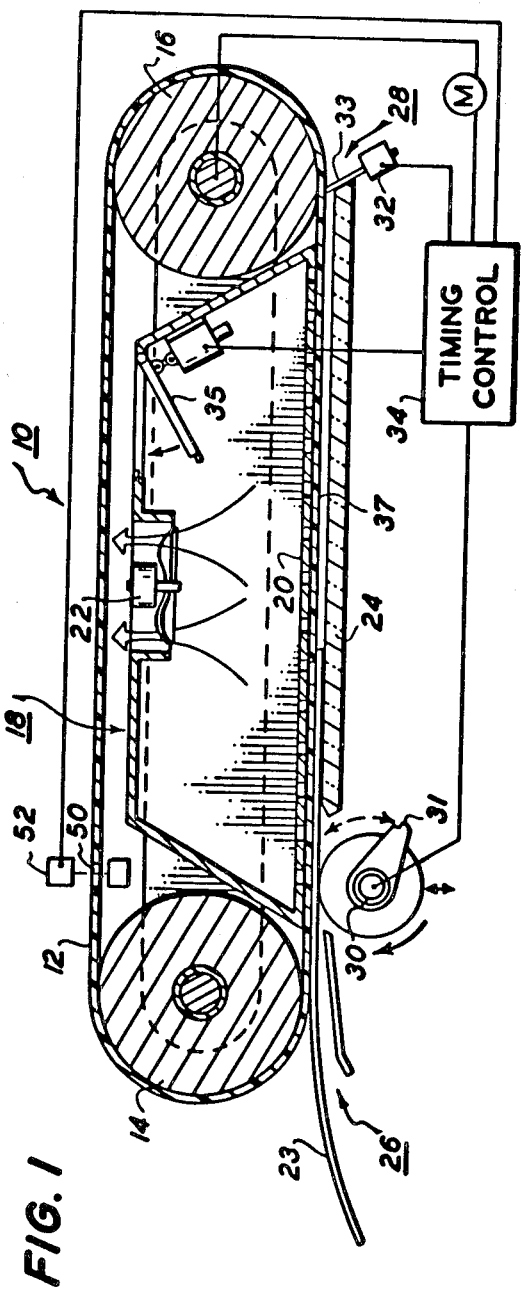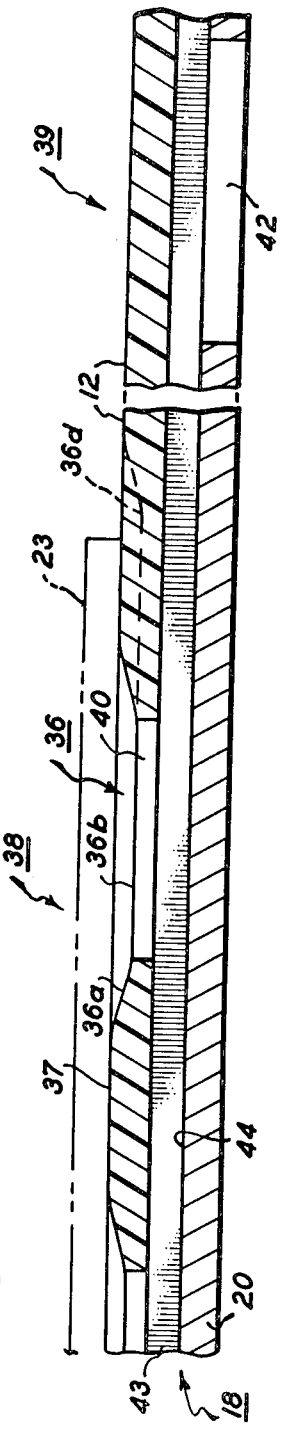

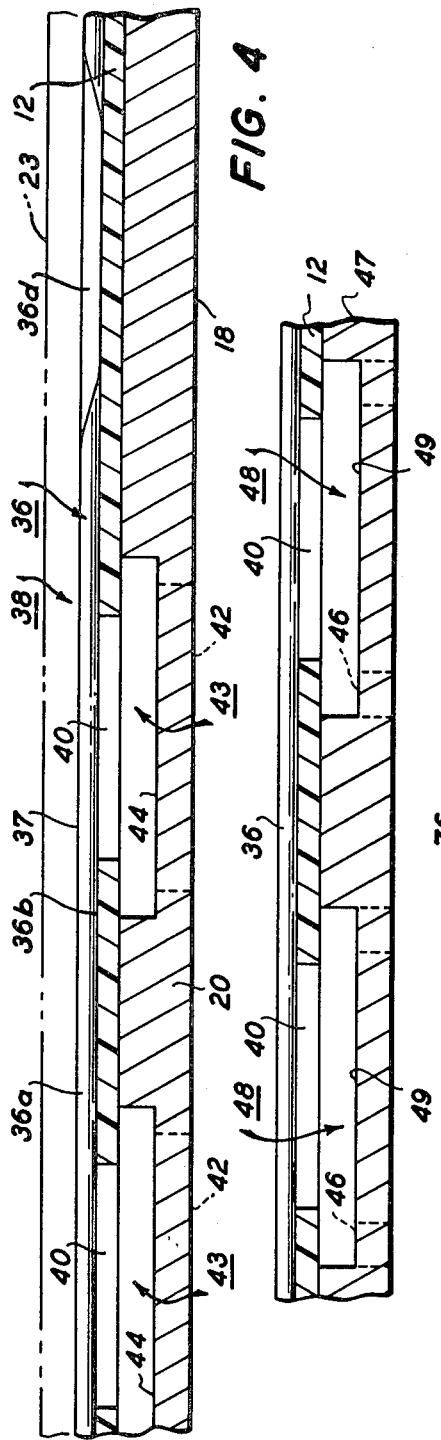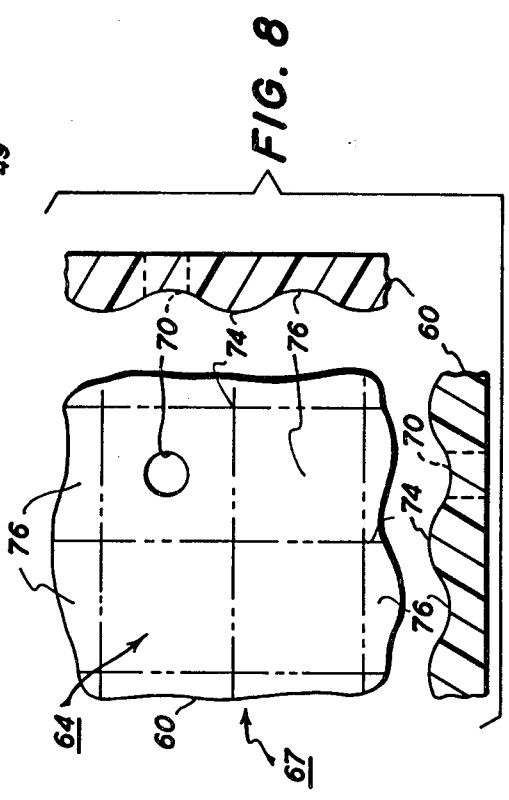

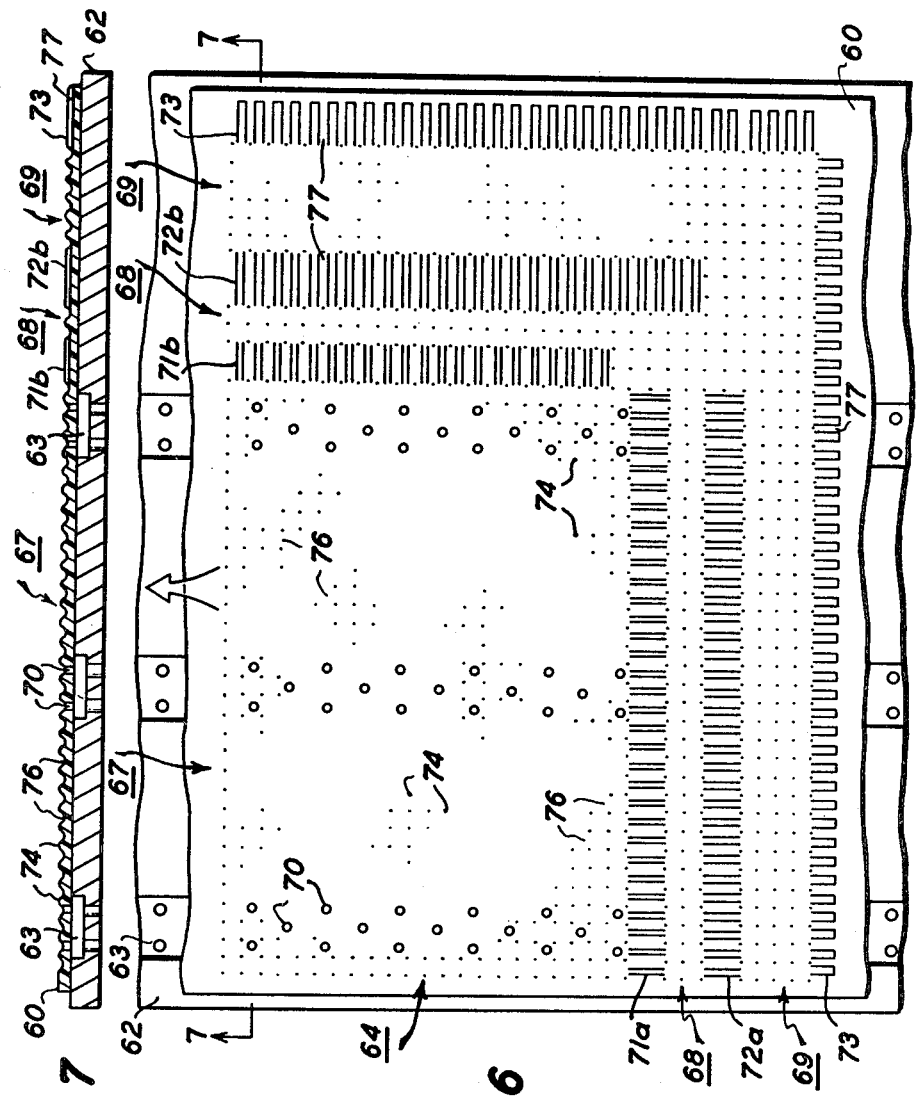

DOCUMENT BELT WITH DISCRETE VACUUM AREAS

Cross-reference is made to related applications with the same filing date and Assignee, Ser. Nos. 111,051; 111,059; 111,060; 111,061; 111,062; and 111,063. These cross referenced cases and the art cited herein are incorporated by reference to the extent appropriate.

For the faster xerographic and other document copiers now in commercial use, it is increasingly desirable to provide for automatic handling of the individual original documents being copied in order to utilize those higher speed copying capabilities. However, such documents can vary widely in sheet size, weight, thickness, material, condition, humidity, age, and value. The documents may have curls, wrinkles, tears, "dog-ears", cut-outs, overlays, paste-ups, tape, staples, adhesive areas, or other irregularities. Yet it is desirable to be able to semi-automatically or automatically copy a set of documents with a mixture of sizes, types, and conditions, without document jams or document damage. Further, it is desirable to handle such documents with a relatively compact and inexpensive document handling system. Preferably the document handling system is one which may be positionable over an existing or conventional external transparent copying platen (window) of a copier, and which can utilize the same existing or conventional optics system. That is, it is desirable that the automatic document handling system be readily removable from the platen area by the copier operator whenever desired to allow for conventional manual copying of documents, such as books, on the same copying platen.

One of the most important, and difficult to achieve, requirements for automatic or semi-automatic document handling is the accurate and reliable, but safe, transporting and registration of the original document at the proper position for copying. The document should normally be precisely center registered or corner registered (depending on the copier) over the copier platen. This registration accuracy is desirably consistently within less than a millimeter. If the document is not properly registered, or slips after registration, undesirable dark borders and/or edge shadow images may appear on the ensuing copy, and/or information near edges of the original documents may be lost, i.e., imaged beyond the edges of the copy-sheet or not imaged.

Known document handling systems include various document transports which move the original documents over the platen. This may be a single or multiple belt transport which utilizes frictional or electrostatic forces. However, it is known to be advantageous to have positive vacuum detention or gripping of the document against the belt by vacuum apertures in the belt to avoid uncontrolled slippage or skewing of the document relative to the transport belt, as disclosed in U.S. Pat. No. 4,043,665 issued Aug. 23, 1977 to John R. Caldwell, or U.S. Pat. No. 4,008,956 issued Feb. 22, 1977 to Denis J. Stemmle. Other vacuum belt document transport publications include "Research Disclosure" Publications No. 16659, February 1978; No. 17427, October 1978; and No. 17809, February 1979, published by Industrial Opportunities, Ltd., Havant, Hampshire, U.K..

It is also known to apply vacuum holding to a document for copying through a plate or cover rather than through a moving transport belt, as disclosed in a British application No. 42877/76 by L. D. Smith et al., now U.K. specification No. 1,532,880, laid open May 12, 1978 in Japan as laid-open No. 53-52436, and U.S. Pat. No. 3,245,291, issued Apr. 12, 1966, to R. Wick et al..

While not designed for document handling for a copier, with appropriate optical characteristics, etc., it is known to provide vacuum transports for sheets with ribs extending substantially above the vacuum apertured surface to distribute the vacuum under the sheet to be transported. Examples are shown in U.S. Pat. Nos. 3,123,354 issued Mar. 3, 1964 to F. Ungerer; 3,452,982 issued July 1, 1969 to E. Bischoff; 3,477,558 issued Nov. 11, 1969 to F. J. Fleischauer and 3,583,614 issued June 8, 1971 to J. E. Foster. Multiple belt copy sheet transports with vacuum applied in the spaces between the belts are also known, e.g., U.S. Pat. Nos. 3,281,144 issued Oct. 25, 1966, to L. H. Turner et al., and 3,743,403 issued July 3, 1973 to F. J. Sanza.

It is also known to register the original document with roller nips or retractable or fixed registration gates in various ways. One way is to pre-register the document to a vacuum belt with pre-registration fingers or rollers and move the document on the belt a known distance over the platen into registration without slippage, as disclosed in the above-cited patents. Another way is to provide retractable registration fingers (or a fixed gate or stop edge) aligned with one edge of the platen and engaging a frictional (non-vacuum) belt to normally stop an edge of the document being transported by the belt at the registration position overlying the platen, as disclosed in U.S. Pat. No. 3,910,570 issued Oct. 7, 1975, to Charles D. Bleau, or various of the earlier references cited in the above Caldwell U.S. Pat. No. 4,043,665. In such systems the belt must slip relative to the document without damaging it once the document has been stopped, at least briefly until the belt is stopped. The Bleau U.S. Pat. No. 3,910,570 also discloses rollers 32 engaging the inside of the belt 17 between each pair of the gate fingers 29 to form localized bubbles or protrusions of the belt. (See FIG. 4 and Column 4, lines 43 et al., for example). U.S. Pat. No. 3,863,912 issued Feb. 4, 1975, to R. D. Korff discloses a document belt with parallel ridges extending around the belt in its direction of movement. It is known that the document may be either driven forward into a downstream platen edge registration gate or reversed over the platen to back the document up against an upstream platen edge registration gate. It is also known to register documents without such gates or other stops by sensing the passage of the lead or trail edge of the document with a photodetector as it moves toward or past registration and driving the document belt forward or backward for a brief fixed distance or time thereafter without slippage of the document thereon, providing the documents are deskewed.

In these above-described systems where the document is on a moving belt transport but must be registered at a precise location by a registration gate, to the belt or to a fixed position, there is a serious difficulty in avoiding the escape or slippage of the document from between the tips of the registration gate fingers and the moving belt, particularly for certain document weights and conditions (e.g., curled edges). Besides loss of registration, such slippage can cause serious damage to the original documents. Also, if a document is stopped by only one of two or more spaced fingers it can become skewed. Besides mis-registration image loss and edge or background effects this skewing can cause serious problems in the further transporting of the document.

If the document transport comprises a plurality of separate narrow document belts, the registration fingers can be extended up between the belts to insure capture of the document edge. However, as noted in the above-cited Bleau patent, such separate belts can produce background stripes on the copies from the images or shadows of the belt edges which are behind and adjacent the document. This is aggravated by dirt contamination of the belt edges.

Such "show-through" and/or "show-around" background printout on the copies, respectively, is a general problem with various document transport belts. That is, when a document is imaged for copying against a belt, any optically significant irregularities in the belt surface can be copied also, to print-out on the copies as undesirable dark background areas. To avoid this problem, a single smooth, continuous and optically uniform light reflective document belt surface larger than the largest document to be copied thereon is preferred. Any edges, transitions or vacuum apertures in the belt in the exposure area can produce shadows which "showthrough" translucent documents being copied, and/or "showaround" any mis-registered or undersized documents. Normal dirt contamination (darkening) of belt surface irregularities aggravates these background problems.

Show-around problems and registration criticality can be reduced by slightly magnifying the document image to "overfill" the copy sheet area, or by registering a document edge beyond the imaged area. However, both approaches sacrifice the non-imaged information near the edges of the document, and that loss is additive for copies of copies. Further, when reduction copying of a document is done (i.e., less than 1:1 optical reproduction), or where the document is smaller than the copy sheets, the image reproduced on the copy will include substantial areas of the belt which are within the now expanded original image area and thus beyond (outside the area of) the document. Thus, the potential "show-around" problem area is more extensive.

One partial approach to the "show around" problem is to not aperture the vacuum belt in narrow bands corresponding to the normal edge positions of the documents as disclosed in U.S. Pat. No. 4,047,812 issued Sept. 13, 1977 to James W. Hogan. However, as noted there, this results in no vacuum holddown forces being applied to those areas of the document. Also, since the aperture pattern is otherwise continuous, the apertures are still visible adjacent the lead and trail edges of the document. This Hogan patent, and the above-cited Caldwell patent, approach the "show through" problem by using small diameter vacuum apertures. However, as noted there, very fine holes are subjected to clogging by paper lint and other contamination. They also provide increased air resistance and a smaller effective vacuum area, thereby increasing the power requirements of the vacuum source to maintain desired vacuum acquisition and holding forces on the document. Another approach is to use a transparent vacuum belt with a light reflector behind the belt, as disclosed in U.S. Pat. No. 4,120,579, issued Oct. 17, 1978, to D. J. Maiorano. However, scratches or dust on the belt can cause background print-out. U.S. Pat. No. 3,677,643 issued July 18, 1972 to B. K. Sagawa teaches a vacuum document exposure drum with vacuum orifices recessed within reflective conical recesses to prevent orifice printout in an overlay (contact print) copier.

The present invention is not limited to any particular type of document illumination system, and is applicable to, for example, either scanning lamp stationary document copying or moving document stationary optics copying (slit scanning). However, it is particularly suitable for full frame flash illumination systems with light directed and reflected to the document and document belt from all angles, since this assists in eliminating edge shadows. One such illumination system is disclosed in U.S. application Ser. No. 15,558 filed Feb. 26, 1979 by John A. Durbin et al. and its cited art.

The present invention overcomes or minimizes the above-discussed problems in an original document handling apparatus for moving successive individual document sheets on the surface of a movable belt into a registered position for copying at a copier imaging station by providing a document transport belt with vacuum grooves which are so constructed as to appear optically smooth to the copier optics, yet which also provide improved document vacuum retention, and which minimizes both show-through and show-around.

In the exemplary document handling system, disclosed in the following specification, in which documents are moved with a vacuum belt to an imaging station of a copier, and where the documents are imaged on a light reflective principal document imaging surface on a first side of said belt, and in which the documents are held against said first side of said belt by an air flow applied from a vacuum manifold at the second side of said belt through multiple vacuum apertures extending through the belt and opening on said first side, said first side of said belt has a multiplicity of shallow vacuum channels recessed below said principal light reflective document imaging surface. These vacuum channels have sufficiently gently sloping walls and light reflective characteristics substantially equal to or better than said document imaging surface to avoid imaged shadows thereof at said imaging station. These vacuum channels are pneumatically connected to said vacuum apertures but extend outwardly from and beyond the vacuum apertures over said document imaging surface of said belt. The openings of said vacuum apertures are disclosed as limited to areas of said first side of said belt coverable by the smallest document to be imaged thereagainst, to avoid show-around exposure of said apertures during document imaging. The openings of said vacuum apertures at said first side of said belt are recessed within said vacuum channels so that said vacuum aperture openings are substantially spaced below said document imaging surface. Also, said vacuum channels are sufficiently narrow to prevent vacuum deformation of flimsey documents directly against said openings of said vacuum apertures, yet the openings of said vacuum apertures at said first side of said belt are sufficiently large to provide a low impedance relatively unrestricted air flow therethrough relative to said cross-sectional areas of said vacuum channels, so that document hold-down force-generating air-flows can be drawn from the direction of the edge of the document through said vacuum channels under the document and into said openings of said vacuum apertures, with a vacuum generated in said channels between said document edge and said vacuum apertures, and so that neither said vacuum channels or said vacuum apertures are substantially imagable when a document is imaged on said document imaging surface at said imaging station.

Additional disclosed features include providing of a minimum area of said openings of said vacuum apertures greater than the minimum cross-sectional areas of their respective vacuum channels to which they are pneumatically connected so that the predominant vacuum drop from said air flow will occur in said channels under a document rather than in said vacuum apertures, and wherein said channels may extend beyond at least one dimension of the largest documents to be imaged on said belt to provide pneumatic edge hold-down forces.

Further features and advantages of the present invention pertain to the particular apparatus whereby the above noted aspects and features of the invention are attained. Accordingly, the invention will be better understood be reference to the following description, including the drawings forming a part thereof, wherein:

FIG. 1 is a cross-sectional side view of an exemplary document handling system in accordance with the present invention;

FIG. 3 is an enlarged partial cross-sectional view taken along the lines 3—3 of FIG. 2;

FIG. 4 is an enlarged partial cross-sectional view taken along the lines 4—4 of FIG. 2;

FIG. 5 is an alternative embodiment of the portion of the system illustrated in FIG. 4;

FIG. 6 is a bottom view of an alternative document belt embodiment of the document handling system of FIGS. 1-4;

FIG. 7 is an enlarged partial cross-sectional view taken along the lines 7—7 in FIG. 6; and FIG. 8 is an enlarged central portion of FIG. 6, and its cross-sectional side view on two orthogonal axies.

Figure 2:
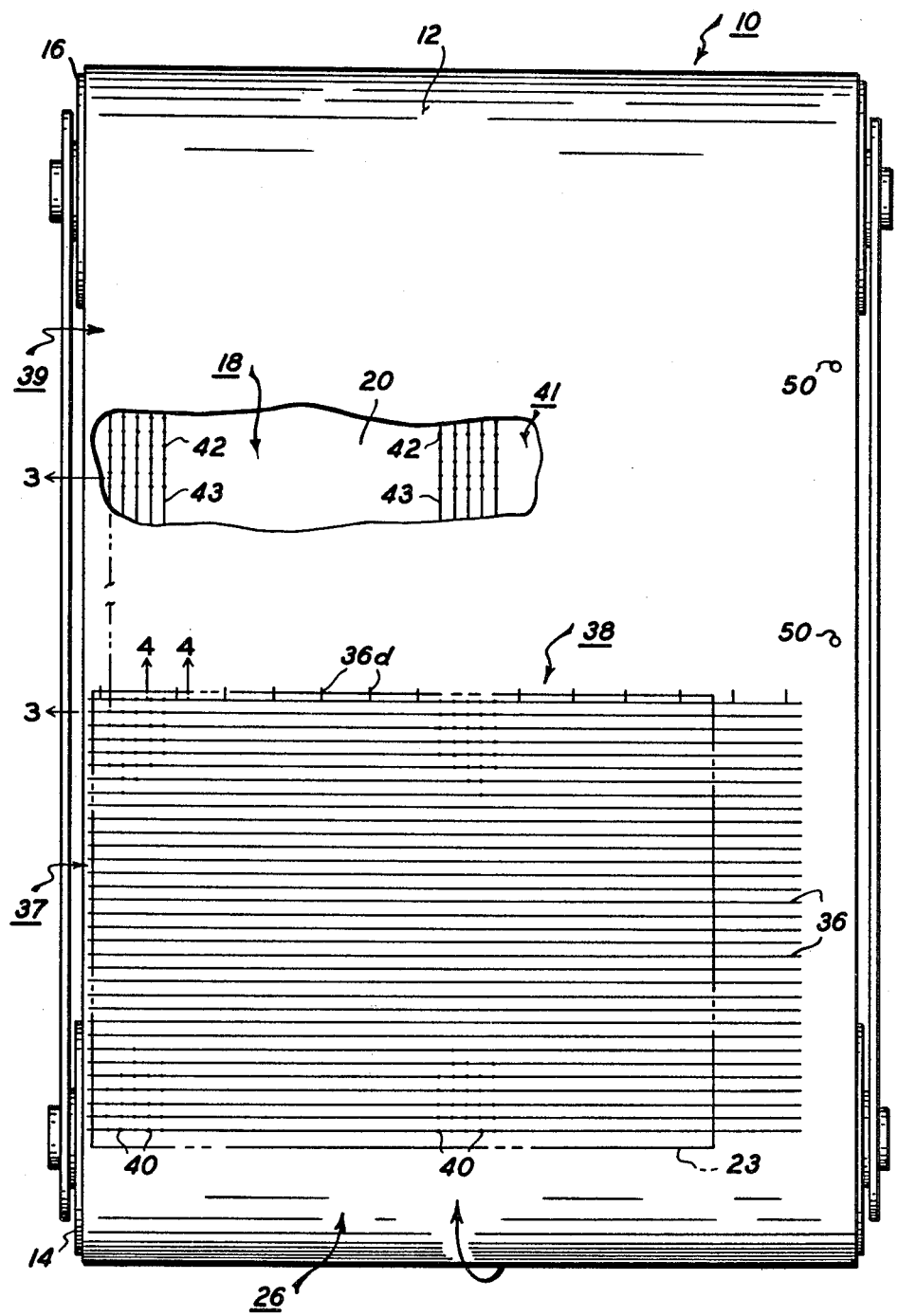
FIG. 2 is a bottom view of the exemplary system of FIG. 1.

Referring first to FIGS. 1-4, they illustrate one example of the present invention. However, it will be appreciated that the invention may have many other different structures or orientations, and combinations with various xerographic or other copying systems. FIGS. 5-8 and the above-cited and other patents provide examples of further or alternative apparatus.

Referring first to FIG. 1, there is shown an exemplary document handling apparatus 10. This drawing is not to scale, as it is transversely foreshortened for drawing clarity. That is, the document belt 12 illustrated would be preferably relatively more elongated between its end support and drive rollers 14 and 16. Further, while a semi-automatic document handling system for a copier is illustrated here for simplicity, it will be appreciated that the invention is fully applicable to various recirculating document handling systems for pre-collation copying.

In the exemplary apparatus 10 to FIG. 1 there is illustrated a vacuum manifold 18 with an aperture plate 20 for applying a vacuum to the backside of an apertured vacuum document belt 12, which vacuum is provided by a blower 22. The document belt 12 and the plate 20 are mounted so that a document 23 may be transported on the document belt 12 closely and evenly spaced (e.g., approximately 0.5 mm) above the transparent platen 24 of the copier, where the document may be copied within the depth of focus of the optical system of the copier through the platen 24.

Documents 23 here are inserted into the belt transport system at a document input area or loading station 26 near the upstream end of the belt 12, manually or automatically. The documents may then be ejected from an output area 28 at the downstream end of the belt and the platen. Alternatively, the belt drive may be reversed to eject the document from the input area 26. It will be appreciated that various known sheet guides or baffles, and/or idler rollers engaging the belt 12, as shown at the input area 26, may be utilized to assist the document path at either the input or output areas. Upstream pre-registration gates or rollers may also be provided.

Referring now to the registration of the documents 23 at the desired copying position on the platen 24, there are illustrated in FIG. 1 two registration gate systems; an upstream registration gate 30 and a downstream registration gate 32. These gates 30 and 32 have respective sets of registration fingers 31 and 33 which are movable in and out of the path of the documents for their registration, i.e., toward and away from cooperative engagement with the belt 12.

As indicated, there are various types of registration systems for successfully registering individual document sheets on the surface of the belt 12 in the registration position for copying at the copier imaging or exposure station. For example only one, or both, or neither, of the registration gates 30 and 32 illustrated here may be utilized, and these gates may have different structures or be utilized in different manners.

Both of the illustrated registration gates 30 and 32 as well as the belt drive "M" may be conventionally controlled by a timing control 34. Preferably the control 34 is incorporated in a general conventional central copier microprocessor control with programming. Some examples are disclosed In U.S. Pat. Nos. 4,062,061 issued Dec. 6, 1977 to P. J. Batchelor et al.; 4,076,408 issued Feb. 28, 1978 to M. G. Reid et al.; 4,078,787 issued Mar. 14, 1978 to L. E. Burlew et al.; 4,099,150 issued July 4, 1978 to J. L. Conin; 4,125,325 issued Nov. 14, 1978 to P. J. Batchelor et al.; and 4,144,550 issued Mar. 13, 1979 to J. K. Donohue et al. However, timing and control may be provided by any desired conventional logic, such as commercial timing circuits, or multiple lobe cams on a timing shaft, or any other suitable timing system which provides the desired sequence of operations.

The present invention is not limited to a particular registration system but rather relates primarily to the unique construction and operation of the document belt 12 to be described hereinbelow. However, some examples of the operation of possible registration systems will be briefly discussed. In one mode, the upstream registration gate 30 pre-registers the document to a selected fixed position on the belt 12 upstream of the platen and then the document is driven for a known fixed distance from the gate 30 downstream over the platen without slippage. Copying takes place after this known advancement into the registration position, as described n the above-cited U.S. Pat. No. 4,043,665. Note that in such a system the downstream registration gate 32 is not required. However, if desired, it may be additionally provided for final or re-registration.

Alternatively, only the downstream registration gate 32 may be utilized, i.e., the document would not be pre-registered. In this case, the document is driven by the belt 12 over the platen until the lead edge of the document contacts the raised registration fingers 33, which are positioned directly at the downstream (beveled) edge of the platen 24. Relative frictional slippage is then provided between the belt 12 and the document so that the document may deskew and fully align against all the registration fingers 33. For this, the document belt is run for at least a brief period after the registration is achieved by the downstream registration gate 32.

For this registration mode there is additionally illustrated here an intermittently operable vacuum control valve 35. This may be a solenoid actuated flapper valve controlled by the timing control 34, as shown, in coordination with one or both registration systems. Opening of the valve 35 quickly reduces the vacuum in the manifold 18, and thereby reduces the vacuum applied through the document belt 12 to allow slippage between the document and the belt during registration. Closing of the valve 35 quickly restores the vacuum. This valve operation may also be done during initial loading or pre-registration of the document onto the belt 12 at the input area 26. If desired, the area to which such a controlled vacuum may be applied may be a separate portion of a belt, i.e., a separate vacuum manifold chamber or section.

The downstream registration gate 32 is conventionally opened by its solenoid or other actuator linearly pulling the registration fingers 33 out of the path of the document. After the document is copied it may then be ejected in either direction from the platen by the belt drive. The upstream registration gate 30 conventionally operates, as shown by its dashed line with arrows, by rotating in and out of the document path, with a clutch drive, cam, or solenoid.

Referring now to FIGS. 2, 3 and 4, the unique configuration of the belt 12 will be described, with particular reference to the enlarged cross-sectional view of FIG. 3.

As shown in FIG. 2, the belt 12 has a plurality of narrow, elongated, permanent shallow grooves 36 in minor, spaced, document imaging areas thereof. These grooves 36 here extend linearly transverse the direction of movement of the belt. They are below the planar document transporting outer surface 37 of the belt. The grooves 36 are each narrower in width (the transverse dimension in FIG. 3) than the spacing across the intervening belt surface 37 between the grooves, and are not connected together, so as to provide pneumatic separation. All of the grooves 36 have smooth and gently sloped side walls 36a and are so configured as to avoid any reproducible shadows from the grooves at the copier imaging station. That is, the side walls 36a are both at a gentle acute angle, preferably less than approximately 20°, from the document transporting surface 37 so that there are no "edge shadows" from the sides of the grooves. With improved optical cavity illumination the groove wall slope may be somewhat greater than 20°. There are no sharp transitions or edges. The base 36b is preferably not greatly more than approximately one millimeter in depth below the surface 37, and preferably not greatly less than approximately 0.2 millimeters deep. Thus, the preferred grooves are effectively shallow and gentle slight undulations in the belt surface. The groove surfaces preferably have substantially the same or better reflective characteristics as the surface 37. The entire groove 36, i.e., both sides 36a and the bottom or base 36b, are thereby fully and uniformly illuminated by the illumination system of the copier. Thus, both show-through and show-around copy defects are normally avoided, and substantially entirely eliminated for conventional documents.

The width of the grooves 36, preferably less than approximately 5 millimeters, is sufficiently narrow such that the beam strength of the document 23 prevents even a thin document from sagging or being pulled into contact with the base 36b of the grooves 36, even when a vacuum is applied to the grooves 36. Some slight corregation of light weight sheets partially into the grooves may be desirable, providing there is no less of optical resolution or other image distortion. This increases the stiffness or beam strength of these thinner sheets, particularly against bending on the orthogonal axis, and may assist their registration. Note that the grooves do not need to be provided across the full width of the belt. They may extend somewhat less than the width of the widest document to be transported or alternatively, somewhat more (note FIG. 2).

The lateral or transverse alignment of the belt 12 along the axes of the roller 14 and 16 and its drive may be accomplished in a known manner by use of sprockets or "V" grooves on the rollers 14 and 16 mating with corresponding sprocket holes or grooves along at least one edge of the belt 12. Alternative known alignment or realignment systems or guides of the belt may be utilized.

A variety of materials and methods of fabrication may be utilized for the belt 12. Preferably it is fabricated from an elastomeric view surface energy flexible plastic or rubber material, with sufficient conductivity to avoid static electricity build-up. The overall belt thickness may be approximately 0.4 to 1.5 millimeters. The belt with the grooves 36 integrally formed therein may be continuously fabricated and then the appropriate belt length cut off and seamed to form an endless loop. Alternatively, the grooves can be machined, or the entire belt with grooves monolithically formed by casting. If desired, the belt can have two or more layers of different material, such as a "Mylar" inelastic plastic substrate with an overcoating of white (light reflective) higher friction elastomeric or other material providing the document transporting outer surface 37.

The vacuum belt 12 and its vacuum system provide vacuum retention of the document to the belt in a manner which avoids show-through or show-around images of the vacuum holes in the belt 12 from being reproduced on the copy sheets. However, it also provides improved, lower power, vacuum retention of the copy sheets. That is, both desired features are enhanced with this system rather than one feature being sacrificed for the other. As shown in FIG. 2, multiple vacuum apertures 40 are provided through the belt 12 opening only in the base area 36b of the grooves 36. That is, the vacuum apertures in the belt are open at the image side of the belt, but recessed within the grooves 36, relatively large, and in the thinnest portions of the belt.

Placing the vacuum inlet holes 40 in the valleys or bottoms 36b of the grooves moves them substantially out of contact with the document being transported. This serves to prevent show-through as long as the document has reasonable light diffusion characteristics. However, there is an equally important purpose. Since the document does not directly overlie and block the vacuum apertures, the grooves 36 distribute the vacuum from the holes along the grooves under the document and towards the edges thereof, as will be further explained. Further, each groove is a separate, independent, vacuum area.

Preferably the vacuum holes 40 are located in discrete spaced groups 38 around the belt circumference to which the documents are registered, so that the vacuum holes will always be fully covered by the documents during imaging, to avoid show-around imaging of the holes. For example, by selection of the length of the belt and the size and spacing of the groups or patterns of holes along the belt, two, three, or another integral number, of discrete apertured and grooved areas 38 may be provided for the number of documents to be fed per belt revolution. For example, assuming a 30 centimeter platen in the direction of belt motion, three 37 centimeter pitches (spaced hole area patterns) 38 can be provided with a belt 111 centimeters in circumference. That is, three hole groups could be provided equidistantly around the belt.

Only the area under the lead edge of the document to be captured need be apertured. Thus, for circumferential grooves the lengths of each hole group in the direction of belt motion could be on the order of only 5 cemtimeters and sixteen holes approximately 1.6 millimeters in diameter and approximately 3 millimeters apart, center-to-center, would be appropriate. In the exemplary transverse groove system of FIG. 2 there are only ten holes 40 in each groove, one group of five holes near the registration side, and the other group of five holes spaced 50 mm distant, approximately in the middle of the belt, to underly the narrowest document to be handled, thus forming two circumferential bands to apertures. However, only the limited areas 38 of only, for example, twenty-five transverse grooves are apertured, so that each area 38, including its bands of apertures 40 only have 168 mm of circumferential lengths on a 103.5 cm belt (in the direction of belt movement).

By selecting the pitch (spacing) and size of the hole and groove patterns 38 so that an unapertured length of belt 39 is available which is longer than the platen size, an unapertured and ungrooved area of belt may be automatically positioned over the platen during manual copying. It will provide a continuous, completely smooth and unapertured planar background for any size of copy being manually copied, overlying the entire platen, as will be further described herein.

The "overhang" of the belt, i.e., its extension beyond the upstream and downstream edges of the platen, may be utilized for the document input area 26 and output area 28. This additional document transporting by the same system before and after copying may be desirably utilized to integrate this system with input sheet feeders and output stackers or other transports. For example, with the above-described exemplary three pitch belt and 30 centimeter platen and 3.8 centimeter diameter pulleys, there is provided an approximately 9–10 centimeter overhang or extension of the belt at each side of the platen.

As a preferred example, as in FIGS. 2–4, for a platen capable of full frame imaging of large standard documents a 103.5 cm long endless belt 12 between two 25.4 cm diameter pulleys may have two spaced imaging areas, i.e., two patterned belt surface areas 38, with, for example, each pattern 38 having approximately 25 parallel vacuum grooves 36 extending linearly approximately 366 mm across the belt surface 37 transverse the direction of belt motion and spaced approximately 7 mm apart, center line to center line, but with vacuum holes in only those two minor areas of the total groove lengths which will be covered by the smallest document to be transported. The vacuum apertures 40 through the belt may be approximately 2.8 mm in diameter round holes perpendicular the belt surface. The holes may be evenly spaced apart along the bottom (and center line) of the grooves by approximately 9.4 mm within their above-described two bands. The grooves themselves may be approximately 4.6 mm wide at the belt imaging surface, and approximately 0.2 mm deep. The total belt thickness may be only approximately 0.45 mm. The shape of the grooves may be smoothly cylindrical to a much larger radius, e.g., approximately 13.3 mm, to avoid any angular transitions which could cause edge shadows. This also ensures, to the same end, a desired small slope angle of less than 20 degrees, and preferably less than 10 degrees, between the side walls of the grooves and the imaging surface. This low angle of incidence is an important feature. The transition lines between the edges of the grooves and the imaging surface are also preferably rounded or smoothed to blend in or transition smoothly.

A relatively low power and low pressure vacuum system 22 may be utilized. For example, a manifold vacuum level of not substantially greater than 25 millimeters of water and an air flow of somewhat more than only $1.8 \times 10^{-3}$ cubic meters per second could be sufficient.

With the above-described system of discrete vacuum hole groups, to which the document is to be fully overlaid, it will be appreciated that the document is registered to a specific belt positions at the document input area 26. This may be accomplished by holding the document at the pre-registration gate 30 (or other preregistration gate) until a belt cursor 50, which may be holes or other indicia along the belt edge, actuates a photo-optical or other sensor 52 connected to the timing control 34. The document is thereby released at the appropriate time for the lead edge of the document to overlie the hole pattern and the document is then fed by the belt without slippage over the platen into registration. No over-platen registration is required. The same or other fiduciary marks 50 and sensors 52 may be used to stop the belt at the registration position (with the document positioned over the platen).

With the above described registration system, the document is registered against the vacuum belt compltely overlying one of the discrete minor vacuum aperture patterned areas 38 of the belt 12. The belt is then driven, by a conventional servo motor "M", stepper motor, timed drive braked motor, geneva drive, or the like, connecting with, or integral, belt drive roller 16, or 14. The apertured area 38 of the belt is thus driven from the initial loading station, in which the pattern 30 is overlayed with the document, into the exposure station of the copier. The initial registration or loading of the document overlying all (and hiding all) of the vacuum holes 48 of one entire pattern 38 is maintained as the apertured area 38 is advanced to the exposure station. This will normally be the position in which the lead area of the vacuum aperture pattern 38 is adjacent the downstream or registration edge of the exposure platen 24 of the copier. The vacuum apertured areas 38 are in at least two discrete and minor areas of the belt which are substantially spaced circumferentially along the surface of the belt in the direction of belt motion. The belt is unapertured and optically smooth and continuous between the spaced vacuum apertured area 38. The spacing between the vacuum apertured area 38 is sufficiently great so that when one vacuum pattern 38 has transported the document to the exposure station, no vacuum apertures are exposed to the copier optics for copying from any of the other vacuum apertured areas 38. That is, preferably, only one area or pattern of vacuum apertures 38 is overlying the platen at any time during which a document is being copied. This can be accomplished by having the circumferential spacing between patterns being greater than the dimensions of the platen. However it will be appreciated that in some copiers, such as those with optical reduction, that the dimensions of the platen may be larger than the actual dimensions of the exposure area or exposure station for normal copying. Thus, the spacing along the belt between the vacuum apertured areas 38 in such copiers for normal copying need only be equal or greater than the dimensions of the actual exposure station.

It has been additionally found that by appropriate spacing of the vacuum aperture 38 along the endless belt 12 circumference that spacing may be such that one vacuum area 38 is in the document loading station, while another vacuum aperture 38 is in the exposure station. Thus, copying of one document (without show-through or show-around of vacuum apertures) may be accomplished simultaneously with the registration loading of the next document over the next vacuum area 38. This is particularly desirable in a document handler in which the document is slowed down or stopped in the exposure position, since this allows the overlay and deskewing of the next document to be accomplished during the same time delay period the previous document is being copied, and with the belt stopped or slowed down. The belt then may be quickly accelerated and decelerated to place this next document in the exposure station while the previous document is being either ejected from the document handler or restacked in the document stacker in the case of a recirculating document handler.

It will be appreciated, as to the means for registering the loading of the document to the vacuum belt, that various known and suitable systems may be utilized. The system disclosed herein senses the presence and position of one vacuum apertured area 38 in the proper position for the infeeding of a document thereover by permanent marking indicia, such as holes, at predetermined positions along at least one edge of the belt outside of the optical imaging station exposure of the belt. The document registration then comprises feeding the document onto the belt in registration with the sensed position of the belt by starting document feed rollers or belts, and/or by releasing a registration gate holding the lead edge of the document as illustrated, or the like. However, it would also be possible to provide a loading registration system in which the document is fed uninterruptedly over the belt, and when a document lead edge sensor determines that the lead edge of the document has been fed slightly past the most downstream vacuum apertures of the pattern 38 to then acquire the document by pressing it against the belt and applying a vacuum and then start moving the belt.

With the belt configuration described herein, wherein the maximum dimensions of the apertured area 38 in any direction are smaller than the smallest conventional document to be transported and copied on the document belt 12, and wherein the belt surface is optically continuously uniform to the copier optics everywhere except for said vacuum apertures 40, it will be appreciated that with the above-described system, in which the document is only placed on the belt so as to completely overly one entire pattern of vacuum apertures 38, and wherein the spacing between the apertured areas 38 is as described above; that show-around can be completely eliminated, because no vacuum apertures are ever exposed to the copier optics and thereafore cannot provide visible printout on any copies, for any of the sizes of documents being copied. However, as otherwise indicated herein, to be fully effective, there is also employed the disclosed system for conveying a vacuum holding force from these minor apertured areas 38 out under a much larger area of a much larger document, if the document handling system is to have the capability to handle a wide range of document sizes without slippage. This transverse extension of the effective vacuum area acting on the backside of the larger document is provided by the vacuum groove system described herein without causing increased show-around problems for smaller documents, because the grooves themselves, in their apertured areas, are effectively optically invisible to the copier in the imaging station. The unapertured grooves have effectively the same light reflective background characteristics as the major areas 39 of the belt (between the patterns 38) which are ungrooved.

As an additional feature, as indicated above, by the selection of the appropriate spacing between the minor hole and groove patterns 38, a completely unapertured and ungrooved area 39 of the belt 12 may be provided which is larger than the entire area of the platen 24. By automatically positioning this completely smooth and continuous light reflective background over the platen whenever the document belt is not being used for automatic or semi-automatic document feeding, a platen cover can be provided having the same background-free optical uniformity for manual copying as is conventionally provided by the flexible white rubber sheet platen covers of xerographic copiers which do not have document handlers.

By conventionally mounting the document handling unit 10 here pivotally over the platen, the entire unit 10 may be lifted up and a document sheet or book or the like placed over the platen manually. When the document handling unit is lowered, the belt 12 will overly the document and prevent it from lifting out of focus above the platen. This alternative manual copying feature, in which the document belt 12 is stationary, is known in other vacuum belt document handling systems. Such manual copying may be utilized, for example, with documents whose sizes or conditions are not appropriate for automatic vacuum feeding by the document belt. However, such manually placed documents, particularly unusually small, or odd sized, or transparent, or very thin, documents, are ones which often have even more severe show-around or show-through problems than those which are feedable. That is, the copying of shadows of vacuum apertures through or around documents is often more objectionable in the manual copying mode. This has been considered a serious disadvantage in the use of a vacuum document feeder in comparison to a fixed surface manual platen cover. It has even been proposed to provide an alternative manual platen cover in place of the vacuum belt for the manual copying mode, but this obviously adds complexity and cost. All of these problems have been eliminated by the present system.

In order to provide the desired completely unapertured and ungrooved continuous single belt surface over the platen for manual copying, there are provided two cooperating features: an adequate spacing of unapertured belt area 39 between at least two of the patterns 38, and a means for automatically registering this area 39 over the platen when the copier is to be used for manual copying. For example, if the blank pitch 39 between vacuum apertures is on the order of 38 centimeters (for a platen of that dimensions) this 38 centimeter long segment of the belt must be centered over the platen to avoid any exposure of any vacuum apertures 40. Note that, as described above, this is not the normal stopping position of the belt during automatic or semi-automatic document feeding. The normal stopping position is with one apertured area 38 overlying the platen. Thus, a separate and additional belt registration mode is preferably provided. This separate registration mode causes the document belt to advance or cycle by an additional odd increment to move the vacuum apertured area 38 which was previously overlying the platen out of the exposure station, and overlays the exposure station with an unapertured belt area 39. It has been found that this may be automatically actuated and controlled in various ways. One way is to have the belt drive automatically start, advance for the desired preset distance, and stop automatically upon a switch being actuated by the lifting of the document handling unit 10, since the document handling unit is lifted for manual copying. However, this would cause the belt to be moved slightly when the cover is lifted, which might startle the operator. Thus, it is preferable to have the belt automatically advance into this manual copying position automatically in response to the termination of the automatic or semi-automatic document feeding of the belt. This can be accomplished by a simple timing arrangement which is a part of the controller or timing control 34. That is, when, after a time interval of a few seconds, or less, no additional documents have been fed by the belt, e.g., the belt has not moved during this time period, then the belt will automatically shift from its normal stopping position (with the one vacuum apertured area 38 over the platen) into its manual copying position with no apertured vacuum area 38 over the platen.

The sensing of the belt position can be done with the same cursors or fiduciary position marks on the belt and sensors connected to a servo drive motor for the belt as previously described for the loading registration of the belt patterns 38 with the document. Alternatively, a separate hole or mark in the belt, and/or separate sensor, can be utilized to sense whether the belt is in the proper manual copying position and stop the belt drive in that position. This can also be done on machine start-up.

As a further alternative, it will be appreciated that a system may be designed in which, after each document is copied and ejected or restacked, the belt is automatically stopped in the manual copying position so that the automatic or semi-automatic document feeding may be interrupted at any time, even during a run, for immediate manual copying without moving the belt. As another alternative, a separate button or switch and/or drive could be provided to move the belt into the manual copying position.

The above described arrangement of a vacuum belt with only two vacuum apertured areas 38 thereon is particularly desirable for the above described manual copying mode, as allowing a relatively short overall belt length to provide a large unapertured area 39. However, it will be appreciated that the unapertured length 39 of the belt can be provided by increasing the overall belt length in various ways without necessarily substantially increasing the overall size of the document handling unit. For example, as described, the rollers at opposite ends of the document belt may be spaced substantially beyond the edges of the platen, so that a vacuum pattern may be spaced off of the platen even though it is still in the lower flight of the belt, i.e., in the platen overhang area of the extended belt. Alternatively, larger belt support rollers or multiple rollers or guides which provide convolutions or bights in the return belt flight may be provided to increase the overall belt length. It has also been found, as discussed elsewhere herein, that the apertured areas 38 may be made considerably smaller by restricting them to only the lead edge areas of the smallest document, and this has been established to provide satisfactory vacuum document retention with the improved vacuum retention systems disclosed herein. This reduction of the area 38 of the vacuum apertures correspondingly increases the available unapertured pitch 39 therebetween without increasing the overall belt length.

The system disclosed herein is adapted to handle a wide range of document sizes and weights. The following table lists the more common standard document and copy sheets and their approximate sizes, which vary with cutting accuracy, humidity, etc.

| Common Standard Commercial Paper Sheet Sizes | | |
| --- | --- | --- |
| Size Description | Size in Inches | Size in Centimeters |
| 1. U.S. Government (old) | 8 × 10.5 | 20.3 × 26.7 |
| 2. U.S. Letter | 8.5 × 11 | 21.6 × 27.9 |
| 3. U.S. Legal | 8.5 × 13 | 21.6 × 33.0 |
| 4. U.S. Legal | 8.5 × 14 | 21.6 × 35.6 |
| 5. U.S. Engineering | 9 × 12 | 22.9 × 30.5 |
| 6. ISO* B5 | 6.93 × 9.84 | 17.6 × 25.0 |
| 7. ISO* A4 | 8.27 × 11.69 | 21.0 × 29.7 |
| 8. ISO* B4 | 9.84 × 13.9 | 25.0 × 35.3 |
| 9. Japanese B5 | 7.17 × 10.12 | 18.2 × 25.7 |
| 10. Japanese B4 | 10.12 × 14.33 | 25.7 × 36.4 |

As previously noted, with the present system, show-around of the vacuum apertures is prevented by insuring that any document which is imaged overlies all of the apertures adjacent its edges. I.e., the vacuum apertures are all preferably located well inside of the document edges so as to all underlie the document in the area being imaged. Those vacuum apertures which must be outside of the area covered by a small document will be sufficiently distantly spaced from the document edges so as not to be imaged. This is enabled by the unique vacuum groove construction which allows the vacuum from the apertures to be applied not just in the local area of the apertures, but rather to be extended along the grooves under all, or substantially all, of the full dimension of the document. If the smallest documents to be copied are, for example, International Standard B5 sized sheets, all of the vacuum holes can be located within an area of that size (176×250 mm) and there will be no holes visible to the copier lens when it is in its registered position. As indicated above, this is greatly assisted by having all of the vacuum holes in specific pattern area 38 which are widely spaced between unapertured areas 39 around the belt's circumference, coupled with a registration or timing means which insures that the documents are only fed onto the document belt in registration with a hole pattern area 38, i.e., each document is individually fed only as a pattern area 38 approaches the proper position for infeeding of the document into registration therewith. Note that the document sheet may be driven into registration with the belt, or the belt may be driven into registration with the document. That is, the speed of position of either the document or the belt may be controlled by the conventional drives for either, which may be suitable mechanical systems or servo-motor driven.

For a good capture of the lead edge of the document, this registration and feeding is preferably arranged so that, as illustrated by the dashed line document outline 23 in FIG. 2, the lead edge of the document extends only a few millimeters beyond the first or leading apertures 40 in the pattern 38. With the transverse grooves illustrated here, this also means that the lead edge of the document extends slightly beyond the groove pattern. Thus, the leading and trailing edges of the document may completely cover the groove patterns and extend into ungrooved as well as unapertured areas of the belt. With appropriate spacing of the areas 38, one document can be being acquired or loaded upstream of the platen simultaneously with the imaging of the preceding document.

As additionally illustrated in FIG. 2, for assistance in acquisition of the lead edge, additional transverse extensions 36d of the grooves 36 may be provided. These grooves 36d are integral and connecting short extensions of the outer-most or lead edge groove 36. The grooves 36d are unapertured, but are provided with a vacuum by the apertures 40 in their communicating main groove 36, and act to extend the applied vacuum out to and slightly beyond the lead edge of the document to provide more positive holddown of the lead edge. However, this is an optional feature. These groove extensions 36d have the same smooth and shallow angle and light reflecting characteristics as the main grooves 36 so as to be effectively optically invisible to the copier.

It is important to note that in a system as described above, where the distance between the vacuum belt and the platen is within the optical depth of field of the optical system of the copier, that the document does not have to be held flat against the document belt to be in focus. Thus, even if only the lead edge area of the document is positively vacuum gripped by the belt, or if less than half of the document width in the case of a large document is positively gripped by a vacuum area, the remainder of the document can only sag or move away from the belt until it contacts the platen, and will be pulled across the platen by the vacuum gripped areas of the same sheet with relatively low friction, and will still be maintained within the optical depth of field for copying. It is only necessary that the total vacuum force applied to the document be sufficient to prevent the document from slipping on the belt once it is acquired and registered thereon.

The present system allows an effective vacuum holding force to be provided with low pressures and low air flow rates, thus requiring much lower power, and also allowing a lower volume (smaller) vacuum manifold behind the belt. The total number of vacuum apertures required is greatly reduced. The hole diameters and their total number are small enough such that the manifold pressure will not significantly drop even if all of the vacuum holes are exposed, yet the holes need not be so small as to have significant clogging problems.

Considering now the vacuum manifold 18, to further reduce both the vacuum requirements and the potential show-around print-out of vacuum holes even if they are exposed (uncovered), as an alternative, the manifold plate 20 may be only apertured in the actual document imaging area of the smallest document to be imaged. The manifold plate 20 has a white, light reflective, surface. As the apertured areas of the belt pass over the unapertured areas of the manifold, they may have a light reflective bottom manifold surface 44 under the apertures 40, even though the apertures 40 are provided with a vacuum. This feature is illustrated in the enlarged cross-sectional views of FIGS. 3 and 4, and the broken away belt area 41 of FIG. 2, where the manifold plate 20 is exposed (for illustration purposes only). This feature helps reduce the potential for printout of the holes 40. The manifold plate 20 contains spaced vacuum apertures 42. These apertures 42 here are pneumatically connected (open into) spaced grooves 43 recessed in the outer manifold surface abutting the back of the belt. These grooves 43 in the manifold surface are oriented transversely of the grooves 36 in the belt, but are aligned with the holes 40 in the belt to apply vacuum thereto. The belt holes 40 are in linear rows in the direction of belt movement aligned with corresponding manifold grooves 43. The grooves 43 in the manifold may be unapertured outside of the smallest document imaging area, but extend the full length of the manifold plate 20. Thus, the grooves 43 can communicate the vacuum through the manifold plate to all of the holes 40 at any desired belt position, yet still provide a light reflective surface 44 under the holes 40. The surface 44 is provided by the unapertured bottom of the grooves 43. In other words, similarly to the pattern of vacuum apertures 40 in the belt 12 itself, these apertures 42 in the manifold plate 20 can be restricted to specific minor areas of the manifold which wil not normally be exposed to copier optics, and the grooves 43 can extend a substantial distance beyond the last of these apertures across the manifold surface to apply the vacuum to whatever areas of the belt it is desired to apply a vacuum. However, even if apertures 42 are provided along the grooves 43 under other belt areas, most of them will still normally be out of alignment with the holes 40, if the hole 42 spacings are different from the hole 40 spacings in the direction of belt movement as well, i.e., a "vernier" non-alignment.

Additionally, or alternatively, as illustrated in FIG. 5, alternative apertures 46 in an alternative manifold plate 47 may be positioned, angled or otherwise constructed to communicate only with the outside edges of the grooves or slots 48 in the manifold plate. As in the grooves 43 of the embodiment of FIGS. 3 and 4, these grooves or slots 48 in FIG. 5 are preferably substantially wider than the overlying belt apertures 40, so as to allow for some lateral misalignment or movement of the belt, and unrestricted airflow. Thus, the positioning of these manifold aperture 46 laterally off-set, as in FIG. 5, or otherwise, from the outside edges of the belt apertures 40 prevents any of the manifold aperture 46 from ever directly underlying any of the belt apertures 40, thus insuring a light reflective "bottom" 49 for every exposed aperture 40 in the belt. The grooves 48, and the grooves 43, are preferably closely spaced (within less than 2 millimeters, for example), of the outer surface opening of the apertures 40 on the belt imaging surface 37, so that the reflective surfaces 49 or 44 closely underly the apertures 40 and optically "wash out" part of what would otherwise be a solid dark spot on the copy sheet corresponding to document illumination going into the holes 40 and not being reflected back out.

The grooves 43 or 48 in the manifold can be machined or formed therein, and the holes 42 or 46 drilled through the grooves, or the manifold plate 20 can be monolithically formed by plastic casting, molding or the like, (grooves, hole patterns and all). Alternatively, the manifold plate 20 could be formed by overlaying and securing two separate plates together, one apertured and one grooved. As indicated, these grooves 43 or 48 are preferably made substantially larger in cross-sectional areas than the grooves 36 in the belt 12, so as to provide relatively unrestricted airflow therethrough between the interior of the vacuum manifold and the vacuum apertures 40 in the belt. It will also be appreciated that the apertures 42 or 46 through the manifold plate 20 or 47 can be in the form of slots or oval apertures to increase their effective opening areas yet enable a decrease in their lateral dimensions or assist in reducing the overlapping of a manifold hole with a vacuum belt hole.

To express the above in another way, the above-described system provides a light reflective surface 44 or 49 closely spaced below the bottoms of the apertures in the vacuum belt wherever desired, by normally off-setting most of the apertures in the manifold from the apertures in the belt but providing pneumatic communication between the manifold interior and the belt apertures. This vacuum flow path is through unapertured grooves or the like internally of the manifold, so as to provide an unapertured planar light reflective surface closely underlying the belt apertures.

It should also be noted that there is only a very small area of vacuum application to the back of the belt, in the limited areas of the grooves 43 or 48, since they are only needed in the corresponding limited "band" areas of the holes 40. This significantly reduces the frictional drag between the manifold plate 20 and the belt.

Turning now in further detail to the structure and function of the preferred belt 12 grooves 36, as previously indicated each groove provides an independent vacuum holddown which is not affected by the opening (non-coverage by a document) of any of the other vacuum grooves. That is, even if directly adjacent grooves are not covered by a document due to a dog ears, holes, tears, irregular sizes, or mis-registration of the document, the vacuums in the other adjacent grooves are not affected. All of the other, non-affected, grooves can provide a full vacuum force capture of the document. There is no pressure loss between the grooves. Each groove is separated from the others by a substantial area of the planar surface 37 of the belt.

By having the grooves 36 all, or primarily, run laterally, transverse the direction of movement of the belt, as in FIG. 2, it has been found that a substantial improvement can be provided in the vacuum "capture" of the lead edge area of the document, independently of the size of the document, as opposed to having the grooves run or extend in the direction of movement of the document. With such transverse or lateral grooves, several grooves can act independently to capture the lead edge of the document by applying a vacuum force along the full groove areas extending across the full width of the document. If, due to mis-registration or lead edge curl of the document or the like, the first of these lateral grooves is not covered by the document, the document will still be captured by the subsequent grooves only a few millimeters further downstream of the lead edge of the document, and their vacuum holding force is not affected by the failure to capture the document with the first or immediately subsequent grooves. Forming the grooves in the belt parallel to the lead edge area of the document has been found to provide an approximately 3 to 1 higher holddown force for the lead edge area of the document in comparison to circumferential belt grooves.

It has further been found that improved vacuum document holding characteristics can be provided by a specific relationship between the opening area of the vacuum holes 40 and the cross-sectional area of their belt grooves 36. Specifically, it has been found that by providing a much higher resistance to the air flow through or along a groove 36 itself as compared to the airflow through the apertures 40 in that groove, that improved vacuum retention can be provided. This is provided, by having the total area of all of the vacuum holes 40 in each hole area (aperture band or group) each groove 36 to be more than approximately 5 to 6 times greater than the total cross-sectional areas of that groove 36 on both sides of the hole area (the two air inflow areas to a covered groove area). This ratio is greatly exceeded by the very shallow grooves and relatively large holes disclosed in the above-described specific dimensional examples. Thus, with the large spacing between the two 5 aperture groups in FIG. 2, they are also pneumatically independent of one another even within the same groove.

This relatively small cross-sectional area of the shallow grooves provides a substantial restriction or pressure drop in the airflow through the grooves in the areas of the grooves covered by a document. This pressure drop in the groove increases the effective vacuum (reduced air pressure) under the document along each groove 36 beyond the area 38 of aperture 40, even though part of the groove is not covered by the document, e.g., if part of the grooves is exposed by holes, dog ears (bent or missing corners), or tears in the document. This allows the grooves to extend substantially out beyond the edges or sides of narrower documents, as illustrated in FIG. 2, and yet provide a high vacuum hold-down force for these smaller documents even though air is being drawn in from the open groove ends which are extending beyond the document, without having to rely only on the Bernoulli effect from the velocity of the air through the groove, and without having to rely only on a static vacuum provided in a groove which is fully pneumatically sealed by a document.

To express it another way, the drop in pressure in the groove under the outer edge areas of the document applies a higher percentage of the vacuum manifold pressure to the remainder of the groove underlying the document. The impedance of air flow through these restricted cross-sectional area grooves also substantially reduces the airflow into the apertures 40 which are overlaid by documents, even though the entire groove is not covered. This substantially reduces the total air flow requirements of the system since, as peviously described, the vacuum apertures 40 are so arranged as to normally be covered by even the smallest document to be copied. Yet, with this system of high air flow impedance grooves, these same limited areas of apertures 40, in only the minor, small document, areas 38 of the belt, can provide high vacuum holddown forces over a much greater area for much larger documents by extending the same grooves, without additional holes 40, across the belt over the areas to be overlaid by the larger documents. This is accomplished without significantly increasing the airflow or vacuum pressure requirements for smaller documents even though a high percentage or major portion of the vacuum grooves are exposed (uncovered) by the small documents.

It should be noted, however, that the resistance to airflow along the belt grooves 36 is very much lower than the resistance to airflow between adjacent grooves in the covered areas. Further, a substantially larger cross-sectional area of grooves than that disclosed above will still provide effective vacuum hold-down. By increasing the airflow through a larger groove a pressure drop will still occur, predominantly at the edge of the document wherever the groove extends out beyond the document, since this is where the airflow first encounters a restriction in entering the groove.

To summarize, with the disclosed system, vacuum apertures may be provided in the belt which are spaced well inside of the edges of the smallest document. This prevents any possibility of show-around or optical exposure of these holes even if the document is mis-registered or skewed, yet with the disclosed system, the area of applied vacuum can extend out to the edges of the document through the extending unapertured portions of each groove, and without any corresponding increase being required in the airflow. In fact, since the effective area of the applied vacuum increases with larger documents covering more of the groove length, and since the airflow decreases with larger documents due to the increased covered length of the grooves, the same low power vacuum source will automatically provide an increased vacuum retention of larger documents to the belt without any increase in the power being applied to the vacuum surface.

For initial acquisition or capture of the documents with a desired low power, low airflow, vacuum system the document sheets are initially mechanically pressed or urged against the vacuum belt by an angular intersection (sheet beam strength) or with pressing rollers, belts, or the like as in the above-cited U.S. Pat. No. 4,043,665. Once the document surface has been thus mechanically acquired, i.e., is overlying any of the vacuum grooves, there is an almost immediate vacuum drop in the grooves due to their very small volume and the relatively much larger cross-sectional areas of the apertures 40 therein. That is, there is a relatively unrestricted vacuum application through the apertures 40 to the groove once the groove is at least partially covered by the document in the area of the apertures 40. Thus, only a brief initial contact is needed between any area of the document sheet and the belt to obtain vacuum acquisition of that area of the document, e.g., and line contact of a roller 30 nip, and very low vacuum power is required to maintain or hold the document thereafter. Assuming a normal relatively high coefficient of friction of the belt surface 37, the static frictional forces between the belt and document are sufficient to prevent relative slippage once even a minor area of the document has been acquired with this vacuum holddown.

Referring now to FIGS. 6, 7 and 8, there is shown therein a distinctly different embodiment. FIG. 6 is a bottom view at the document imaging area of one patterned area 64 of a different belt 60 overlying a portion of the vacuum manifold plate 62. As described above, the vacuum manifold plate 62 contains vacuum grooves 63 for applying a vacuum to the limited areas of vacuum apertures 70 of the vacuum belt 60. It will be appreciated that the pattern area 64 of the belt 60 illustrated here is, as with the embodiments described above, only a minor portion of the belt, and that the majority of the belt may be both unapertured and ungrooved, i.e., completely smooth. That is, the belt 60 preferably contains only two or three of these patterned areas 64 widely spaced or pitched around the circumference of the belt 60 in the direction of belt motion. For example, two areas 64 or 26 cm circumferential belt length separated by two equal areas of 31 cm belt length.

The pattern 64 of belt 60 of FIGS. 6–8 is separated into different vacuum areas for holding and imaging different standard sizes of documents. Specifically it contains a first, central, area 67 for the smallest size document, a second area 68 for larger documents and a third area 69 for the largest documents. The vacuum apertures 70 in the belt 60 are provided as shown in 3 bands only in the first or central area 67, yet vacuum is provided from there to all of the other areas. Immediately surrounding the first area 67 on two sides 71a and 71b is a first weir area 71. This narrow border pattern 71 is in turn surrounded on the same two adjacent sides, (for a corner registered document system as here) by a second area 68. The second area 68 is correspondingly bordered on two sides and separated by the second weir areas 72a and 72b. This is in turn bordered by the third area 69 which in turn is enclosed by the third weir area 73. Note that the weir areas may slightly interconnect, i.e., be open at their intersecting corners to interconnect (continue) the document vacuum areas 67, 68, and 69 there.

As illustrated in the cross-section of FIG. 7, the areas 67, 68 and 69 are areas of relatively low airflow resistance or restriction between the document and belt, (i.e., under the document) with relatively large belt grooves 76 providing relatively open paths, whereas the weir areas 71, 72 and 73 are areas of much higher airflow restriction provided by much smaller cross-sectional areas of openings or paths (grooves 77) under the document. It should be noted, however, that FIG. 7 is not to scale. The surface patterns thereon are magnified for drawing clarity.

Referring to FIG. 8, this is a small and highly enlarged section of the central area 67 of the belt 60 in a view corresponding to FIG. 6 plus two orthogonal cross-sectional views of that same small section of the belt. An exemplary vacuum aperture 70 is illustrated within this belt segment. As may be clearly seen from the two cross-sectional views in FIG. 8, the surface configuration of the belt 60 in the area 67 (and 68 and 69) is, in this example, smoothly and uniformly sinusoidal on both orthogonal axes. Thus, this surface configuration provides vacuum grooves 76 in both directions or both axes of the belt surface. However, the surface patterns of any of the areas are not limited to this example. These vacuum grooves 76 unrestrictedly distribute under the document, i.e., with little or no vacuum pressure drop, the vacuum applied through the apertures 70 under the document, while the document is held or spaced above the apertures 70 and most of the grooves 76 by the corresponding smooth "bumps" or tops of hills 74 evenly spaced between the intervening grooves or valleys 76 in this pattern.

Referring now to the intervening weir areas 71–73, in contrast, as shown in FIG. 7, these provide airflow restrictive passageways around and between the respective document areas 67–69 for different sized documents. Those weir areas which are overlaid by a document provide a much smaller total cross-sectional groove area under the overlying document, selected to provide a significant airflow restriction. The weir areas may be provided by surface patterns similar to that illustrated in FIG. 8, but much finer, so that the depth and width of the grooves between the bumps is several times smaller in the weir areas, so as to provide much smaller cross-sectional areas for the grooves. However, as shown here instead, all the weir areas are one axis grooves 77.

Examples of the surface pattern dimensions which may be used in the discrete document holding areas 67, 68, 69 is a sinusoidal surface with the period or pitch of the surface waves in both directions, (i.e., the distance between adjacent peaks 74) being approximately 7.6 or 6.4 millimeters, and a groove 76 depth of approximately 1 millimeter between the top of the peaks 74 and the bottom of the grooves 76, and a groove 76 radius of approximately 3.8 mm. In contrast the weir area surface pattern dimensions are several times smaller. One example is image grooves 77 approximately 15 mm long, the same pitch as above, but a flat bottom groove with a depth of only 0.15 mm, 0.3 mm, and 0.66 mm for weirs 73, 72 and 71, respectively. The shorter weir sides 71b and 72b may have slightly deeper (more open) grooves 77 than the longer weir sides 71a and 72a. The inner weirs are designed to provide less air flow restriction than the outer weirs. The specific dimensions, will of course, be selected to match the particular vacuum system and the desired vacuum document holding force needed, depending on the co-efficient of friction between the belt and documents, the maximum document drag forces anticiptated in the system, etc.

Note that the areas 67, 68 and 69 are preferably each formed slightly smaller than a standard document size, respectively. For example, the central apertured area 67 may be slightly smaller than the smallest document to be copied, (e.g., ISO B5 and Japanese B5) (see the above table). The next area, one side of 68 plus 67, may be slightly smaller than the dimensions of the next desired size, (e.g., U.S. 8×10 size), the third (adding the other side of area 68) underlying U.S. 8.5×11 size, etc.. The entire pattern 64 is preferably designed to the configuration disclosed in FIG. 6, which is generally to scale, to accommodate all of the common standard document sizes listed above such that the trailing and inside edges of any of these documents, when properly registered, will be continuously in a weir area. This restricts airflow from these document edges towards the apertures 70, and therefore helps maintain a sufficient vacuum holding level under the entire document with a lower airflow. With such restricted airflow from the outermost overlaid weir patterns, the majority of the manifold vacuum level (all of which is applied through apertures 70 in area 67) will be transmitted with some, but not an excessive, vacuum head loss out through the inner weirs and any gaps there-between to whichever of the other areas 68 or 69 is covered by a particular document. These areas 68 and 69 then distribute this vacuum over their own areas with little or no pressure drop. Further, since the weir groove 77 pattern in the exposed weir areas around the document edges is much finer, and unapertured, show-around tendencies therefrom are further reduced.

With the vacuum belt 60 pattern of FIG. 6, the document would be loaded onto the belt 60 with its lead edge extending slightly (e.g., 4 mm) upstream of the upstream edge of the patterned area 64, i.e., slightly above the line 7—7 in FIG. 6. One side of the document would also be registered to the belt 60 slightly overlying the left side of the patterned area 64 in the corner registration system disclosed here. Thus, two sides of the document will be in completely unapertured and ungrooved belt areas, and normally thereby provide vacuum seals at those sides.

Another embodiment, with a different vacuum belt pattern of vacuum apertures and vacuum grooves, can have a "sunburst" or radially extending (and branching) vacuum groove pattern. Various other groove patterns can be provided.

While the exemplary system described herein, particularly that of FIGS. 2-4, is preferred, it will be appreciated that various other alternatives, variations, modifications or improvements will be apparent to those skilled in the art from the teachings herein, and the following claims are intended to encompass all those falling within the true spirit and scope of the invention.

What is claimed is:

1. In a document handling system for a copier in which documents to be copied at an exposure station are transported thereto by an apertured vacuum belt transport with a light reflective surface to provide an optical background for different sizes of documents to be copied at said exposure station, the improvement comprising:
   at least two discrete minor vacuum aperture patterned areas spaced circumferentially along said surface of said belt in the direction of motion of said belt, said belt being unapertured in the space between said vacuum apertured areas,
   each said vacuum apertured area being smaller in area than the smallest document to be transported by said vacuum belt transport;
   means to register a document in a loading station against said vacuum belt completely overlying one said vacuum apertured area of said belt; and
   means to advance said apertured area of said belt from loading station to said exposure station of said copier;
   said spacing between said vacuum apertured areas being sufficiently great that none of the other said vacuum apertured areas are exposed for copying when said one vacuum apertured area is in said exposure station.

2. The document handling system of claim 1, wherein said means to register a document overlying said one vacuum apertured area includes sensing means to sense the circumferential position of said belt relative to said vacuum apertured areas and document registration means to feed said document onto said belt in registration with said sensed position of said belt.

3. The document handling system of claim 2, wherein said sensing means includes permanent marking indicia at pre-determined positions along at least one edge of said belt extending outside of said optical imaging station.

4. The document handling system of claim 1, 2, or 3, wherein said belt is endless and said vacuum apertured areas are spaced along said belt by a distance corresponding to the belt distance between said loading station and said exposure station so that one said apertured area is in said document loading station while the adjacent said vacuum apertured area along said belt is in said exposure station.

5. The document handling system of claim 1, 2 or 3, wherein said light reflecting belt surface is optionally continuously uniform to said copier in said spaces between said vacuum apertured areas.

6. The document handling system of claim 5 wherein said belt contains vacuum grooves extending from said apertured areas into said unapertured areas, said grooves having optical characteristics conforming to said optically uniform surface.

* * * * *